United States Patent [19]

Lew

[11] Patent Number: 4,829,832
[45] Date of Patent: May 16, 1989

[54] CONVECTIVE INERTIA FORCE FLOWMETER

[76] Inventor: Hyok S. Lew, 7890 Oak St., Arvada, Colo. 80005

[21] Appl. No.: 78,206

[22] Filed: Jul. 27, 1987

[51] Int. Cl.$^4$ .............................................. G01F 1/84
[52] U.S. Cl. ................................................ 73/861.38
[58] Field of Search ........................ 73/861.37, 861.38

[56] References Cited

U.S. PATENT DOCUMENTS

| 4,622,858 | 11/1986 | Mizerak | 73/861.38 |
| 4,660,421 | 4/1987 | Dahlin et al. | 73/861.38 |
| 4,730,501 | 3/1988 | Levien | 73/861.38 |

Primary Examiner—Herbert Goldstein

[57] ABSTRACT

A flowmeter comprises a flow passage provided by a tubing including a first section extending from one anchored extremity; a second section extending from the other anchored extremity in a direction genrally opposite to the first section and a looped midsection connecting the two over-hanging extremities of the first and second sections; an electromagnetic drive vibrating the first and second sections of the tubing relative to one another; and two motion detectors respectively measuring the motions of the two over-hanging extremities of the first and second sections relative to the two anchored extremities of the tubing, respectively, wherein the mass flow rate through the tubing is determined from the difference between the two motions respectively measured by the two motion detectors. Another embodiment of the present invention includes a first tubing with one extremity connected to one port by a flexible coupling and the other extremity connected to the other port rigidly, and a second tubing with one extremity rigidly connected to one port and the other extemity connected to the other port by a flexible coupling; an electromagnetic drive vibrating the first and second tubings relative to one another; and two motion detectors respectively measuring the relative motions between the two tubings at the two extremities thereof. The mass flow rate through the two tubings are determined from the difference in the two motions respectively measured by the two motion detectors.

7 Claims, 1 Drawing Sheet ized by alternating or pulsed electric currents supplied by the power supply unit 15. The signals from the two motion detectors are filtered, amplified and processed by an electronic signal processor 16, which may display or transmit the data on the rate of material flow through the flow tubing, which flow data is obtained from analyzing and comparing the two signals supplied by the two motion detectors. It should be understood that the flow tubing may not be anchored to the frame near the two ports thereof as the structure of the flow tubing is self-sufficient to provide the required structural rigidity when the two ports 2 and 5 of the flowmeter are rigidly connected to a rigid pipe line. However, anchoring of the two extremities of the flow tubing is advised. The vibrator means may include more than one electromagnetic vibrator as demonstrated by embodiment illustrated in FIG. 3. The motion detectors may employ methods such as optical or sonic transducers instead of the magnetic transducer including the pick-up coil and the magnetic target.

CONVECTIVE INERTIA FORCE FLOWMETER

BACKGROUND OF THE INVENTION

In recent years, a mass flowmeter known as the Coriolis force flowmeter has scored a spectacular success technically and financially. As a consequence, many experts as well as novices have been working very hard to develop a better Coriolis force flowmeter. At the present time, there are three versions of the Coriolis force flowmeter in the market; U-tube type, S-tube type and 360 degree loop type of Coriolis flowmeter. Those are the first generation Coriolis force flowmeters which employ bulky and complex construction. The optimum design to bring forth the second generation coriolis force flowmeter remains to be developed and perfected.

BRIEF SUMMARY OF THE INVENTION

The primary object of the present invention is to provide a second generation Coriolis force flowmeter having the optimum design in terms of fluid dynamics and solid mechanics principles.

Another object is to provide a Coriolis force flowmeter comprising a single continuous flow tubing including a first J-shaped section extending from one anchored extremity of the flow tubing and a second J-shaped section extending from the other anchored extremity of the flow tubing in a direction opposite to the first J-shaped section, wherein the two J-shaped sections are interconnected by a midsection of the flow tubing.

A further object is to provide a Coriolis force flowmeter including means for vibrating the two J-shaped sections of the flow tubing relative to one another in a generally symmetric mode about a plane intermediate the two J-shaped sections.

Yet another object is to provide a Coriolis force flowmeter including two motion detectors respectively measuring the relative motions between the two J-shaped sections of the flow tubing at the two over-hanging extremities thereof.

Yet a further object is to provide a Coriolis force flowmeter that determines the rate of material flow through the flow tubing from the difference in the motions between the two over-hanging extremities of the flow tubing.

Still another object is to provide a Coriolis force flowmeter including two parallel flow tubings wherein the first extremities of the two tubings are connected to one port of the flowmeter flexibly and rigidly, respectively, while the second extremities are connected to the other port of the flow meter rigidly and flexibly, respectively.

Still a further object is to provide a Coriolis force flowmeter including means for vibrating the two flow tubings relative to one another and two motion detectors respectively measuring the relative velocities of the two flow tubings at the two opposite extremities of the combination thereof, wherein the rate of material flow through the two flow tubings is determined from the difference in the relative motions at the two opposite extremities of the two flow tubings.

These and other objects of the present invention will become clear as the description thereof proceeds.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
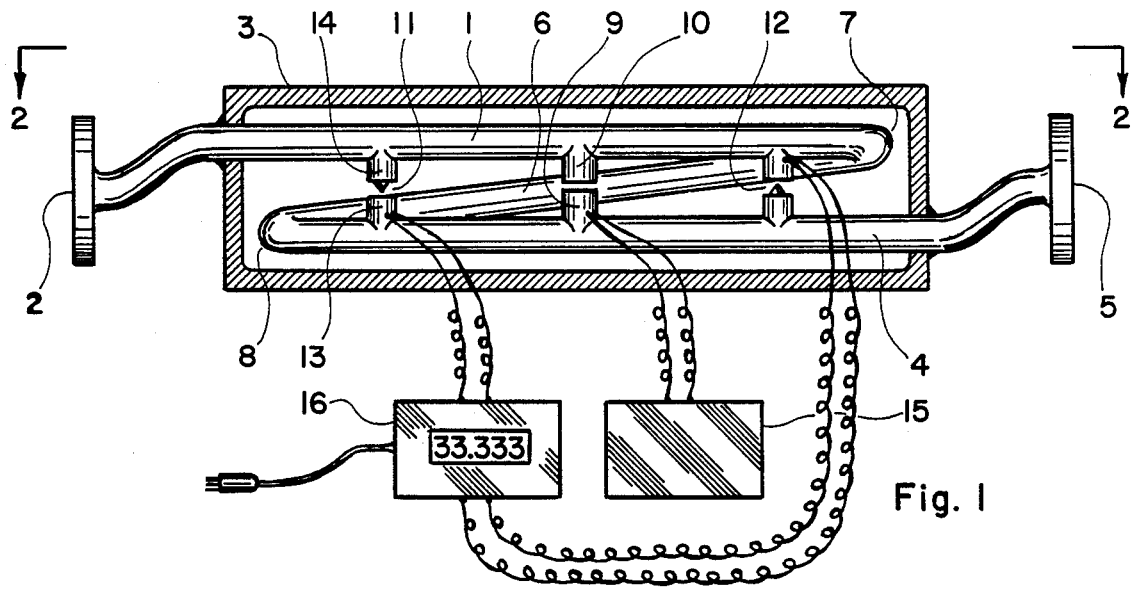
FIG. 1 illustrates an embodiment of the convective inertia force flowmeter constructed in accordance with the principles of the present invention.

In FIG. 1 there is illustrated an embodiment of the convective inertia force flowmeter constructed in accordance with the principles of the present invention. The flow tubing providing the flow passage includes a first section 1 including a first port 2, which is anchored to the frame 3 near the first port 2 and extending in an over-hanging arrangement; a second section 4 including a second port 5, which is anchored to the frame 3 near the second port 5 and extending in an over-hanging arrangement generally offset from and parallel and opposite to the first section; and a midsection 6 connecting the two curved extremities 7 and 8 of the first and second sections 1 and 4 of the flow tubing. The means for vibrating the two sections 1 and 4 of the flow tubing relative to one another including an electromagnet 9 and ferromagnetic head 10 respectively affixed to the first and second sections 1 and 4 of the flow tubing is disposed half way between the two curved extremities 7 and 8 of the two sections of the flow tubing. Two motion detectors 11 and 12 including a pick-up coil 13 and a magnetic target 14 respectively affixed to the two sections 1 and 4 of the flow tubing are disposed intermediate the electromagnetic vibrator 9-10 and the two curved extremities 7 and 8 of the flow tubing. The electromagnetic vibrator 9-10 is energized by alternating or pulsed electric currents supplied by the power supply unit 15. The signals from the two motion detectors are filtered, amplified and processed by an electronic signal processor 16, which may display or transmit the data on the rate of material flow through the flow tubing, which flow data is obtained from analyzing and comparing the two signals supplied by the two motion detectors. It should be understood that the flow tubing may not be anchored to the frame near the two ports thereof as the structure of the flow tubing is self-sufficient to provide the required structural rigidity when the two ports 2 and 5 of the flowmeter are rigidly connected to a rigid pipe line. However, anchoring of the two extremities of the flow tubing is advised. The vibrator means may include more than one electromagnetic vibrator as demonstrated by embodiment illustrated in FIG. 3. The motion detectors may employ methods such as optical or sonic transducers instead of the magnetic transducer including the pick-up coil and the magnetic target.

Figure 2:
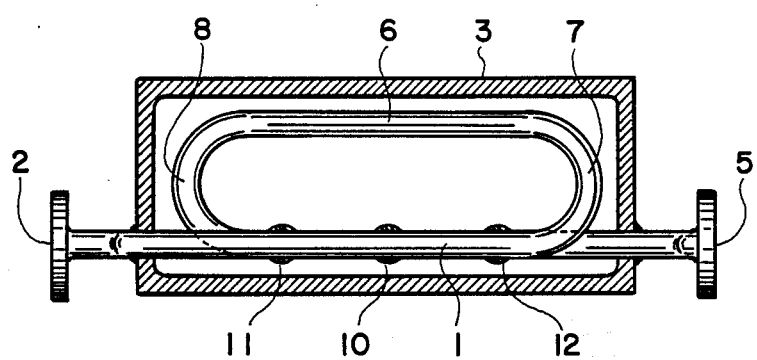
FIG. 2 illustrates another view of the embodiment shown in FIG. 1.

In FIG. 2 there is illustrated another view of the embodiment shown in FIG. 1, which view is taken along plane 2—2 as shown in FIG. 1. The first section 1 of the flow tubing is disposed on a first plane, while the second section 4 is disposed on a second plane offset from and generally parallel to the first plane. The midsection 6 of the flow tube connected to the two curved extremities 7 and 8 of the flow tube provides the transition from the first plane to the second plane in the routing of the flow tubing. It is noticed that the midsection 6 of the flow tubing is disposed on a plane offset from and parallel to a plane commonly including the first and second sections 1 and 4 of the flow tubing, which arrangement provides a narrow and unobstructed space between the two sections 1 and 4 of the flow tubing for the installation of the vibrator means and the two motion detectors. The frame 3 may have a closed and sealed construction and the interior thereof may be evacuated in order to eliminate the effect of the ambient air on the flow measurements. Of course, it is entirely feasible to dispose all three sections of the flow tube on a common plane in constructing a convective inertia force flowmeter of the present invention, wherein the vibrator means and the two motion detectors must be installed around the midsection of the flow tubing.

Figure 3:
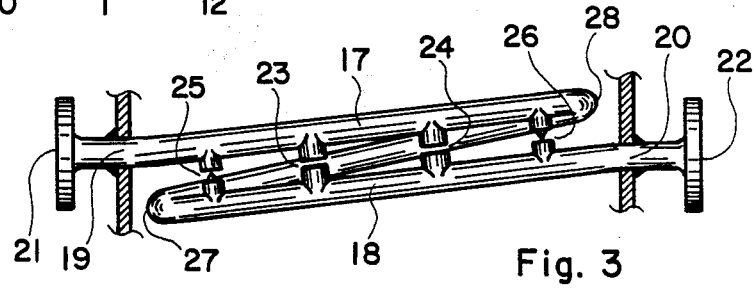
FIG. 3 illustrates a modified embodiment of the combination shown in FIGS. 1 and 2.

In FIG. 3 there is illustrated a modified embodiment of the convective inertia force flowmeter illustrated in FIGS. 1 and 2. This convective inertia force flowmeter has essentially the same elements arranged in the same construction as that shown in FIGS. 1 and 2 with two exceptions, which are, firstly, the two sections 17 and 18 extending respectively from the two anchored extremities 19 and 20 are disposed on two parallel planes slanted with respect to a plane commonly including the central axes of the two ports 21 and 22 of the flowmeter disposed in line, and, secondly, the means for vibrating the two sections 17 and 18 of the flow tubing relative to one another includes a pair of electromagnetic vibrators 23 and 24 installed in a spaced arrangement. Of course, the vibrator means may include only one electromagnetic vibrator instead of the two. The two motion detectors 24 and 26 measure the relative motions of the two sections 17 and 18 of the flow tube at two sections near the curved extremities 27 and 28 of the flow tube.

Figure 4:
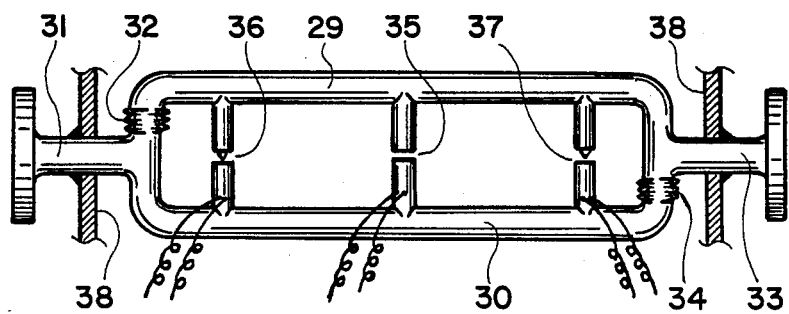
FIG. 4 illustrates another embodiment of the convective inertia force flowmeter of the present invention.

In FIG. 4 there is illustrated another embodiment of the convective inertia force flowmeter of the present invention. This embodiment comprises two flow tubings 29 and 30. One extremity of the first flow tubing 29 is connected to an inlet conduit 31 by a flexible coupling 32 such as a bellow coupling or other type of compressive coupling, while the other extremity is connected to the outlet conduit 33 in a rigid arrangement. One extremity of the second flow tubing 30 is connected to the inlet conduit 31 in a rigid arrangement while the other extremity is connected to the outlet conduit 33 by a flexible coupling 34 such as a bellow coupling or other type of compressible coupling. The vibrator means 35 including an electromagnet affixed to one flow tubing and the ferromagnetic head affixed to the other flow tubing is disposed half way between the two extremities of the two flow tubings. Two motion detectors 36 and 37 are respectively disposed intermediate the vibrator means 34 and the two extremities of the two flow tubings. The inlet and outlet conduits 31 and 33 may be anchored to a rigid frame 38. The entire combination excluding the inlet and outlet ports may be enclosed within the evacuated interior of a sealed container.

The convective inertia force flowmeter shown in FIG. 1 and 3 operates on the following principles: The equation governing the motion of fluid media moving through a flow tubing at a reasonably high Reynolds number is given by equation $$\rho \frac{\partial v}{\partial t} + \rho U \frac{\partial v}{\partial x} = -\frac{\partial p}{\partial y}, \tag{1}$$

where $\rho$ is the density of the fluid, U is the axial velocity of the fluid moving through the flow tubing, v is the lateral velocity of the vibrating flow tubing, p is the fluid pressure, t is the time, x is the cordinate parallel to the axial fluid velocity U and y is the cordinate parallel to the lateral velocity of the flow tubing. When equation (1) is integrated over the cross sectional area of the flow tubing and the "divergence theorem" is applied to the area integral of the pressure gradient, equation (1) can be written in the form $$A\rho \frac{\partial v}{\partial t} + A\rho U \frac{\partial v}{\partial x} F, \tag{2}$$

where F is the force exerted on the moving fluid by the vibrating flow tubing over a unit length of the flow tubing and A is the cross sectional area of the flow passage through the flow tubing. The force F' exerted on the flow tubing by the moving fluid is equal to the force exerted to the moving fluid by the flow tubing in magnitude and opposite in sign. Therefore the inertia force of the moving fluid dynamically loading the flow tubing is given by equation $$F = -A\rho \frac{\partial v}{\partial t} - A\rho U \frac{\partial v}{\partial x}. \tag{3}$$

The total force W exerted on the flow tubing is the sum of the inertia force of the fluid given by equation (3) and the magnetic force G exerted by the electromagnetic vibrator $$W = \left( G - A\rho \frac{\partial v}{\partial t} \right) - A\rho U \frac{\partial v}{\partial x}. \tag{4}$$

The forces represented by the combination of terms in the bracket on the right handside of equation (4), which are exerted on the two sections of the flow tubing, are rotationally symmetric about an axis of rotational symmetry perpendicular to a plane commonly including two sections 1 and 4 of the flow tubing shown in FIG. 1 and passing through the center section of the electromagnetic vibrator. The structures of the two sections 1 and 4 of the flow tubing shown in FIG. 1 are also rotationally symmetric about the same axis. Therefore, the lateral vibrating motions of the two sections of the flow tubing are rotationally symmetric about the same axis and, consequently, two motions respectively registered by the two motion detectors must be identical to one another when those motions are created only by those terms in the bracket on the right hand side of equation (4). In other words, when the mass flow ($\rho$UA) is equal to zero, the relative vibrations of the two sections of the flow tubing respectively registered by the two motion detectors are the same. The inertia force represented by the second term on the right hand side of equation (4) is known as the "convective inertia force". The convective inertia forces exerted on the two sections of the flow tubing are rotationally antisymmetric about the same axis of rotational symmetry, as the lateral velocity v increases in the direction of the axial velocity U in one section while the lateral velocity v decreases in the direction of the axial velocity U in the other section of the flow tubing. As a consequence, the relative lateral vibration of the two sections of the flow tubing created by the connective inertia forces is rotationally antisymmetric about the same axis of the rotational symmetry. The difference in the two motions respectively registered by the two motion detectors is proportional to the rotationally antisymmetric portion of the force given by equation (4). In other words, the convective inertia force defined as the second term on the right hand side of equation (4) is proportional to the difference in the two motions respectively measured by the two motion detectors, i.e., $$A\rho U \frac{\partial v}{\partial x} = C|V_1 - V_2|, \quad (5)$$

where C is a constant of proportionality and $|V_1-V_2|$ is the amplitude of the oscillating curve representing the difference in the two motions respectively measured by the two motion detectors. Equation (5) can be written in the form $$A\rho U = K \frac{|V_1 - V_2|}{|V_1 + V_2|}, \quad (6)$$

where K is another constant of proportionality and | | designates the amplitude of the quantity enclosed therein. In actual practice, it is impossible to construct the flow tubing assembly in a perfect rotational symmetry and, consequently, equation (6) takes the form $$A\rho U = K \frac{|V_1 - \lambda V_2|}{|V_1 + \lambda V_2|}, \quad (7)$$

where $\lambda$ is a calibration constant that is determined by the condition $$\lambda V_2 = V_1 \text{ when } U = O. \quad (8)$$

The convective inertia force flowmeter of the present invention shown in FIG. 1 or 3 determines the rate of mass flow ($\rho UA$) from the difference between the two motions respectively measured by the two motion detectors per equation (5) or (6) or (7). The embodiment of the convective inertia force shown in FIG. 4 operates on the same principles. It is important to construct the flow tubing assembly as perfectly rotationally symmetric as possible, wherein mass of the combination of the sections of the flow tubing and the accessories of the electromagnetic vibrator and those of the motion detectors affixed thereto must be balanced in addition to the rotational symmetry of the flow tubing geometry.

While the principles of the present invention have now been made clear by the illustrated embodiments, there will be immediately obvious to the skilled in the art many modifications of structures, arrangements, proportions, elements and materials which are particularly adapted to the specific working environments and operating conditions in the practice of the invention without departing from those principles.

I claim:

1. An apparatus for measuring mass flow rate comprising in combination:
   (a) a conduit with two extremities secured to a rigid frame, said conduit including a first and second sections respectively extending from said two extremities of the conduit towards one another in a cantilever arrangement in an off-set relationship therebetween, said first and second sections connected to one another by a curved midsection of said conduit, wherein at least a portion of said first section and at least a portion of said second section over-lap one another with a space therebetween, wherein said first and second sections and said curved midsection of the conduit provide a continuous conduit with two over-lapping halves respectively over-hanging from said two extremities of the conduit in a cantilever-like arrangement;
   (b) means for exerting vibratory force on the over-lapping portions of the first and second sections of the conduit, said vibratory force including relative flexural vibrations between the two halves of the conduit; and
   (c) means for measuring difference in the flexural vibrations between the two halves of the conduit as a measure of mass flow rate of media moving through the conduit.

2. The combination as set forth in claim 1 wherein said first and second sections respectively include a generally straight section over-lapping one another with a space therebetween.

3. The combination as set forth in claim 2 wherein said means for measuring difference in the flexural vibrations comprises a first motion detector measuring relative flexural vibrations between an over-hanging portion of said first section and a portion of said second section adjacent to the secured extremity thereof, and a second motion detector measuring relative flexural vibrations between an over-hanging portion of said second section and a portion of said first section adjacent to the secured extremity thereof.

4. The combination as set forth in claim 2 wherein said means for exerting vibratory forces comprises a first electromagnetic vibrator exerting relative vibratory forces between an over-hanging portion of said first section and a portion of said second section adjacent to the second extremity thereof, and a second electromagnetic vibrator exerting relative vibratory forces between an over-hanging portion of said second section and a portion of said first section adjacent to the secured extremity thereof.

5. The combination as set forth in claim 4 wherein said means for measuring difference in the flexural vibrations comprises a first motion detector measuring relative flexural vibrations between an over-hanging portion of said first section and a portion of said second section adjacent to the secured extremity thereof, and a second motion detector measuring relative flexural vibrations between an over-hanging portion of said second section and a portion of said first section adjacent to the secured extremity thereof.

6. An apparatus for measuring mass flow rate comprising in combination:
   (a) an inlet conduit and an outlet conduit;
   (b) a first conduit with one extremity connected to said inlet conduit in a laterally flexible arrangement and the other extremity fixedly connected to said outlet conduit;
   (c) a second conduit with one extremity fixedly connected to said inlet conduit and the other extremity connected to said outlet conduit in a laterally flexible arrangement;
   (d) means for exerting vibratory force on midsections of said first and second conduits, said vibratory force inducing relative flexural vibrations between said first and second conduits;
(e) first motion detector measuring relative flexural vibrations between first halves of said first and second conduits adjacent to said inlet conduit;
(f) second motion detector measuring relative flexural vibrations between second halves of said first and second conduits adjacent to said outlet conduit; and (g) means for determining mass flow rate of media moving through said first and second conduit from difference between the two relative flexural vibrations respectively measured by said first and second motion detectors.

7. The combination as set forth in claim 6 wherein said inlet and outlet conduits are secured to a rigid frame.

* * * * *